(12) United States Patent
Horikoshi (10) Patent No.: US 8,284,324 B2
(45) Date of Patent: Oct. 9, 2012

(54) VIDEO DISPLAY APPARATUS AND VIDEO PROCESSING METHOD

(75) Inventor: Kenichi Horikoshi, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 14 days.

(21) Appl. No.: 12/900,288

(22) Filed: Oct. 7, 2010

(65) Prior Publication Data

US 2011/0249194 A1    Oct. 13, 2011

(30) Foreign Application Priority Data

Apr. 13, 2010  (JP) ................................. 2010-092432

(51) Int. Cl.
*H04N 5/54* (2006.01)

(52) U.S. Cl. ..................................... 348/730

(58) Field of Classification Search ................. 348/730, 348/725, 552, 607, 611, 705, 706; 375/240.1, 375/240.25, 240.28
See application file for complete search history.

(56) References Cited

U.S. PATENT DOCUMENTS

| | | | | |
|---|---|---|---|---|
| 4,623,915 A * | 11/1986 | Bolger | ............................ | 348/566 |
| 6,707,947 B1 * | 3/2004 | Shinohara et al. | ............. | 382/236 |
| 7,366,462 B2 * | 4/2008 | Murali et al. | ................. | 455/3.06 |
| 7,729,421 B2 * | 6/2010 | Campisano et al. | ...... | 375/240.01 |
| 8,063,994 B2 * | 11/2011 | Owaki et al. | ................... | 348/607 |
| 2008/0088635 A1 * | 4/2008 | Callway et al. | ................ | 345/522 |
| 2010/0091836 A1 * | 4/2010 | Jia | ............................. | 375/240.01 |
| 2010/0220215 A1 * | 9/2010 | Rubinstein et al. | ....... | 348/231.99 |
| 2010/0246662 A1 * | 9/2010 | Koto et al. | .................. | 375/240.1 |
| 2010/0290536 A1 * | 11/2010 | Iwahashi et al. | .......... | 375/240.25 |
| 2011/0249194 A1 * | 10/2011 | Horikoshi | ...................... | 348/730 |

FOREIGN PATENT DOCUMENTS

| | | |
|---|---|---|
| JP | 2001008180 | 1/2001 |
| JP | 2009033415 | 2/2009 |
| JP | 2009141940 | 6/2009 |

OTHER PUBLICATIONS

Japanese Patent Application No. 2010-092432, Notice of Examiners Reasons for Rejection, mailed Nov. 24, 2010, (English Translation).

* cited by examiner

*Primary Examiner* — Paulos Natnael
(74) *Attorney, Agent, or Firm* — Blakely, Sokoloff, Taylor & Zafman LLP (57) ABSTRACT

A television receiver apparatus in an embodiment includes: a video processing module configured to perform signal processing for input video signals and to output display video signals to a display panel; a selector configured to turn ON/OFF operation of low-delay processing that involves a short delay time of the display video signals with respect to the video signals as the signal processing; and a controller configured to control the video processing module to perform scaling processing conformable to the display panel when the operation of the low-delay processing is ON and when OFF according to the selector.

15 Claims, 11 Drawing Sheets

VIDEO DISPLAY APPARATUS AND VIDEO PROCESSING METHOD

CROSS REFERENCE TO RELATED APPLICATION(S)

This application claims the benefit of Japanese Application No. 2010-092432 filed in Japan on Apr. 13, 2010, the contents of which are incorporated herein by this reference.

FIELD

An embodiment described herein relates generally to a video display apparatus and a video processing method for video signals in which video signals are subjected to signal processing and displayed on a display module.

BACKGROUND

Television receiver apparatuses (hereinafter referred to as televisions) to which a user can connect a gaming machine to enjoy games have become common. A user connects a gaming machine to an external input terminal of a television and operates the gaming machine, so that video and audio generated by the gaming machine are output from a display and a speaker of the television. That is, by using the television as an external output device for the gaming machine, the user can enjoy games on a large screen.

Now, various sorts of video signal processing are performed in televisions in recent years for improving the image quality. The video signal processing takes a certain amount of time, partly because the processing requires frame-by-frame information and processing. In normal viewing of a broadcast program or the like, a little display delay of less than 50 ms, for example, does not cause a problem. However, if video signals output from a gaming machine are displayed with delay, a user operation for the display will be delayed. This may cause problems such that the user is given a feeling of strangeness or the result of a game changes. For example, in a shooting game of shooting a target moving fast on a display screen, even a little delay time would lead to missing the shooting timing.

As such, a display apparatus is known in which digital operation processing for input video signals can be omitted to reduce the delay time, for example when a game is played.

BRIEF DESCRIPTION OF THE DRAWINGS

FIG. 2B is a block diagram for illustrating video signal processing in a television receiver apparatus, where the low-delay processing is ON;

DETAILED DESCRIPTION

Figure 1:
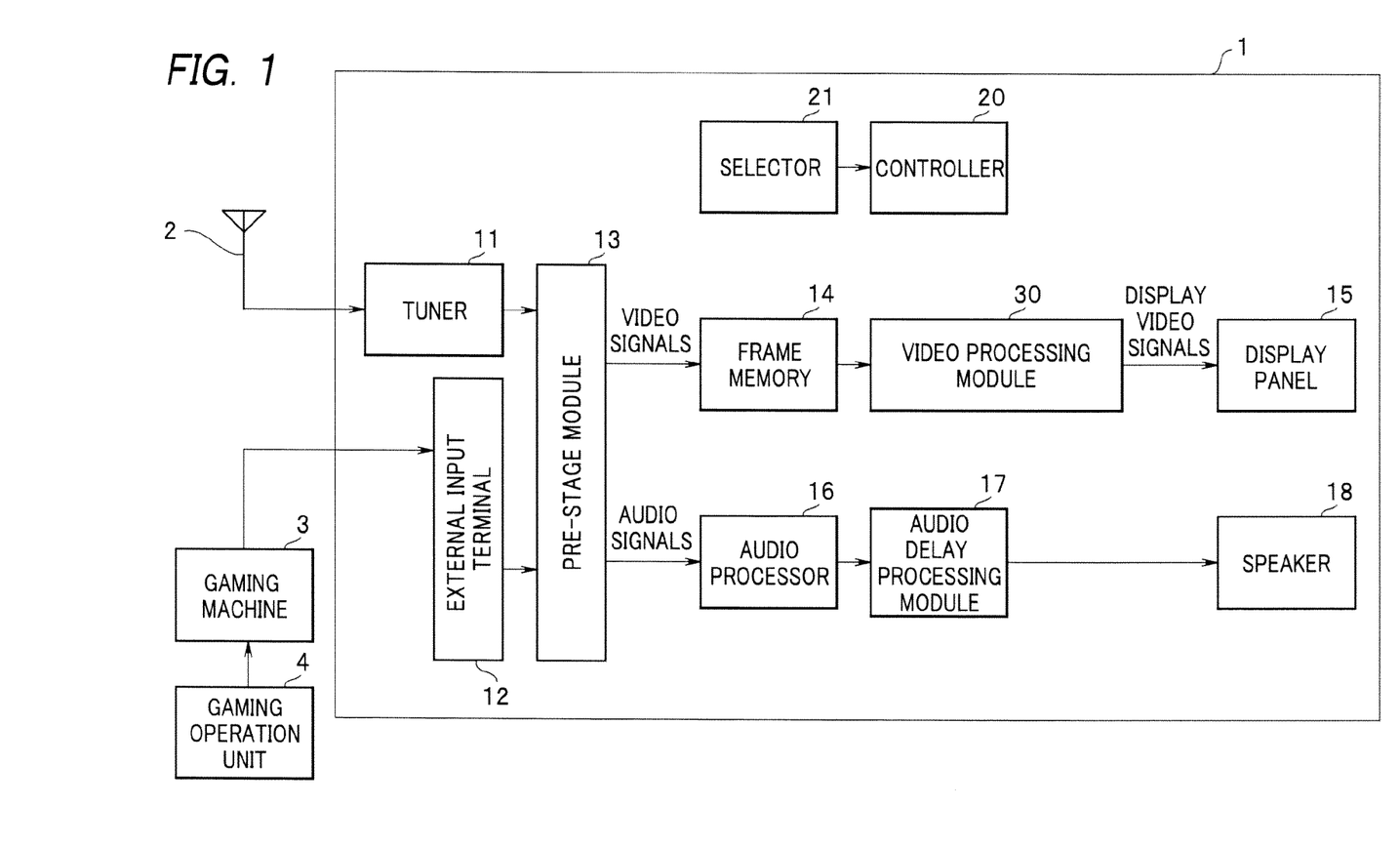
FIG. 1 is a block diagram of a television receiver apparatus in an embodiment.

As shown in FIG. 1, a television receiver apparatus (television) 1 serving as a video display apparatus in an embodiment of the present invention includes a tuner 11, an external input terminal 12, a pre-stage processing module 13, a frame memory 14, a video processing module 30, a selector 21, a controller 20, an audio processor 16, and an audio delay processing module 17. For convenience of illustration, the frame memory 14 and the video processing module 30 are shown as distinct from each other. However, the frame memory 14 may be regarded as part of functions of the video processing module 30, or components such as the frame memory 14 and the video processing module 30 may be mounted on a single system LSI.

With an antenna 2 connected with the tuner 11 and a gaming machine 3 having a gaming operation unit connected with the external input terminal 12, the television 1 outputs video to a display panel 15 serving as a display module and outputs audio to a speaker 18 serving as an audio output module.

The tuner 11 channel-selects/processes broadcast signals and the like of satellite broadcasting such as BS broadcasting and CS broadcasting, terrestrial broadcasting, and the like, and outputs video signals and audio signals. The tuner 11 can also receive signals through communication lines such as a cable TV line.

The external input terminal 12 receives, as external inputs, video signals/audio signals in signal forms such as composite signals, S-Video signals, color-difference signals, and D-sub signals, from external devices including the gaming machine 3 and a hard disk recorder.

The pre-stage processing module 13 receives a plurality of video signals/audio signals and the like from the tuner 11 and the external input terminal 12 and selects any of the video signals/audio signals to perform pre-stage processing. The pre-stage processing module 13 outputs the video signals to the frame memory 14 and the audio signals to the audio processor 16.

The video signals are subjected to signal processing in the video processing module 30 to be detailed later via the frame memory 14, and display video signals are output to the display panel 15. The audio signals are subjected to signal processing in the audio processor 16 and then output to the speaker 18 according to a delay time of the video signals via the audio delay processing module 17 that performs delay processing for the audio signals.

The controller 20 is a CPU that controls the entire television 1 according to settings and the like of the selector 21 to which user instructions are entered.

Here, for comparison to the television 1, a television 101 will be described that reduces the delay time in a manner different from the television 1. In the television 101, when low-delay processing for reducing the delay time is selected, the controller 20 controls to omit part of signal processing of a video processing module 130.

Figure 2A:
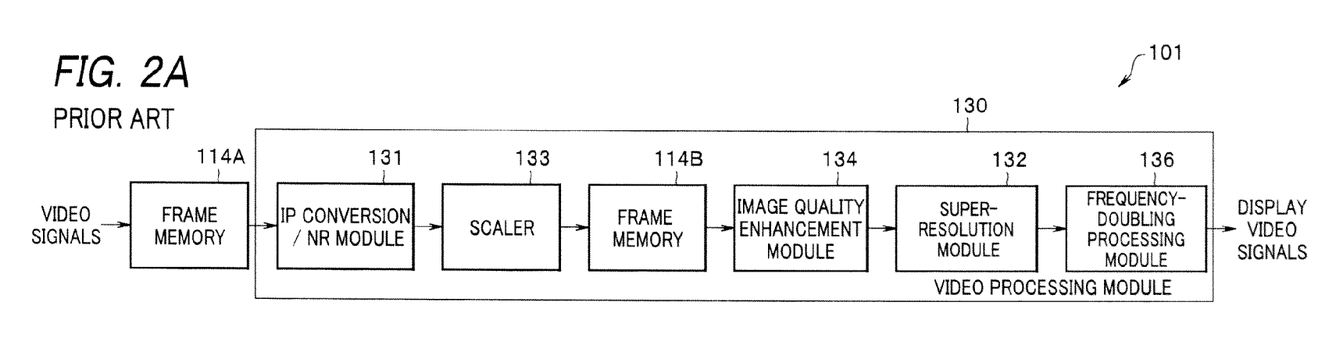
FIG. 2A is a block diagram for illustrating video signal processing in a television receiver apparatus, where low-delay processing is OFF.
Figure 2B:
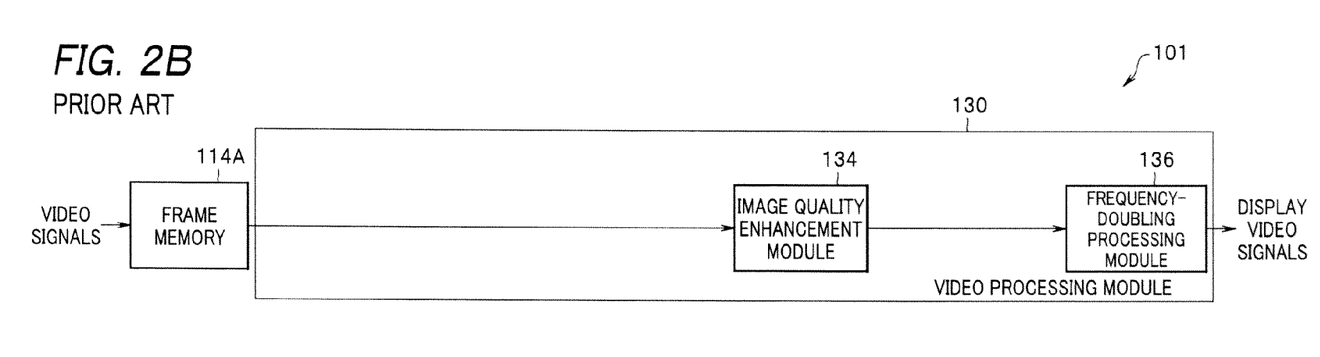

Specifically, when the low-delay processing is OFF (low-delay processing OFF mode), the television 101 performs all the signal processing of the video processing module 130 shown in FIG. 2A. When the low-delay processing is ON (low-delay processing ON mode), the television 101 only performs image quality enhancement processing with an image quality enhancement module 134 as shown in FIG. 2B.

The video processing module 130 of the television 101 has an IP conversion/NR (Noise Reduction) module 131, a scaler 133, a frame memory 114B, the image quality enhancement module 134, a super-resolution module 132, and a frequency-doubling processing module 136.

The IP (Interlace/Progressive) conversion/NR (Noise Reduction) module 131 performs IP conversion processing for converting interlaced video signals into progressive video signals, and also performs noise reduction processing for reducing roughness, flicker, blocking noise, and mosquito noise of the video. That is, the IP conversion/NR module 131 consists of an IP conversion processing module and an NR module. Of course, the IP conversion processing is not performed for progressive input video signals, and the noise reduction processing may be omitted for input video signals with little noise. Thus at least one of the IP conversion processing and the noise reduction processing is performed in the IP conversion/NR module 131.

The scaler 133 performs scaling processing conformable to the specifications of the display panel 15 for video signals incompatible with the specifications of the display panel 15. For example, if the aspect ratio of input video signals is 4:3 and the aspect ratio of the display panel is 16:9, the scaler 133 converts the input video signals into display video signals with an aspect ratio of 16:9.

The frame memory 114B, as with a frame memory 114A in a preceding stage, stores video signals on a frame basis for the image quality enhancement processing in the image quality enhancement module 134 in the following stage. The frame memory 114A and the frame memory 114B may use different memory areas of the same memory as long as the frame memory 114A and 114B can each store video signals for at least one frame.

The image quality enhancement module 134 performs the image quality enhancement processing, for example color correction (gamma correction, white balance adjustment, brightness adjustment, and contrast adjustment), sharpness adjustment, edge enhancement, and response speed improvement, for improving the image quality of the video.

The super-resolution module 132 serving as a resolution enhancing module generates video with a resolution higher than an original resolution of the video by generating new pixel value data between pixels, creating high frequency components, and enhancing the sharpness. That is, the super-resolution module 132 performs resolution increasing processing in which video signals with a high resolution (a second resolution) are recovered by estimating expected pixel values from video signals with a low resolution (a first resolution) to increase the number of pixels.

An "expected pixel value" herein refers to, for example, a value indicated by each pixel of video signals to be obtained if an object from which video signals with a low resolution (the first resolution) have been obtained is image-captured by a high-resolution (second-resolution) camera. Also, "estimating to increase the number of pixels" means capturing features of video in question, estimating expected pixel values from video having a high intra-frame or inter-frame correlation, and setting the estimated pixel values as pixel values to be associated with new pixels. That is, the correlation in the video is utilized. The super-resolution module 132 uses a known technique, for example a technique of recovering video having frequency components higher than a Nyquist frequency determined by a sampling frequency of input video.

The frequency-doubling processing module 136 performs frequency-doubling processing in which the frame frequency is doubled, such as from 50 Hz to 100 Hz or from 60 Hz to 120 Hz, to reduce a feeling of persistence of vision. The frequency-doubling processing may employ a method in which an interpolation frame to be inserted between two successive frames is generated based on motion compensation prediction, or may employ what is called a simple double repeat method in which the same video is simply displayed twice.

Here, the delay time caused by the signal processing in each of the above modules will be described. The frame memory 114A and the frame memory 114B are each a cause of the occurrence of a delay time for one frame, because they store and output video signals on a frame basis. The frequency-doubling processing module 136 is also a cause of the occurrence of a delay time for one frame. The following description will take a frame frequency of 60 Hz as an example, in which case one frame corresponds to about 16.7 ms.

Figure 3:
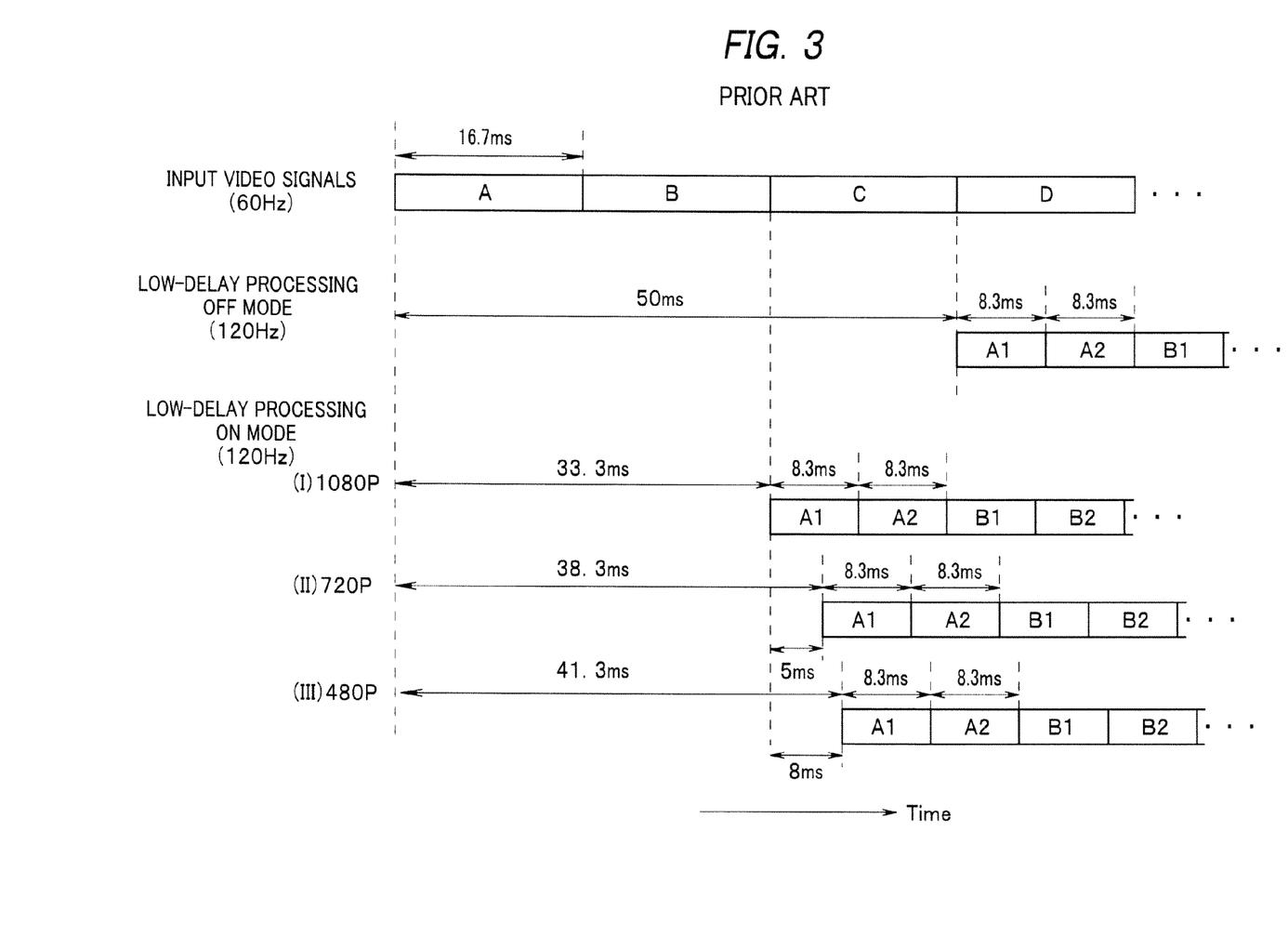
FIG. 3 is a time chart for illustrating delay times in a television receiver apparatus.

Accordingly, as shown in FIG. 3, for example, a delay time of about 50 ms corresponding to three frames occurs in the low-delay processing OFF mode in the television 101. In the low-delay processing ON mode, the delay time can be reduced to 33.3 ms corresponding to two frames.

Figure 4A:
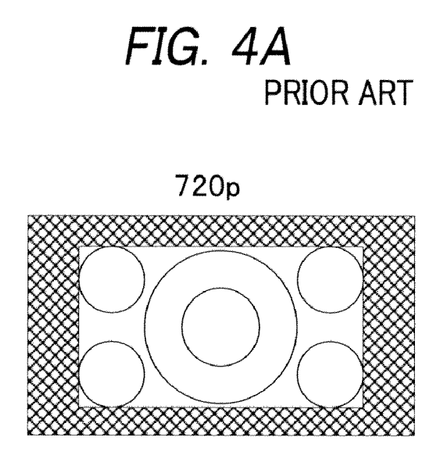
FIG. 4A is a diagram for illustrating a display state on a display panel depending on the type of display video signals, where 720 p video signals are displayed on a 1080 p display panel.
Figure 4B:
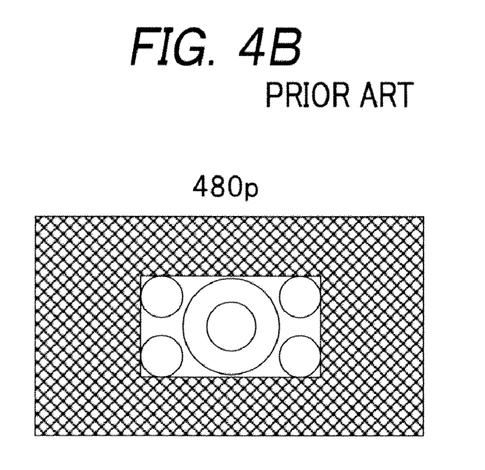
FIG. 4B is a diagram for illustrating a display state on a display panel depending on the type of display video signals, where 480 p video signals are displayed on a 1080 p display panel.

However, as shown in FIGS. 4A and 4B, if input video signals are of 720 p and 480 p that are smaller than 1080 p of the specifications of the display panel 15, time for displaying no-signal areas (black areas) at the top and bottom of the screen occurs. This causes longer delay times, which are 38.3 ms and 41.3 ms respectively. In the low-delay processing OFF mode, either the input video signals of 720 p or 480 p involves a delay time of 50 ms, which is the same as in the case of 1080 p, because the scaling processing is performed.

Thus, since in television 101 the image quality enhancement module 134 is configured to be able to only process video signals directly read from frame memory, video signals need to be taken from the frame memory immediately before the image quality enhancement processing even in the low-delay processing mode. In this case, in a configuration in which video signals are read from the frame memory 114B, the video signals are stored in the frame memory twice and therefore the effect of the delay time reduction is small. As such, video signals are read from the frame memory 114A as shown in FIG. 2B to realize the low-delay processing with the minimum delay time as the television 101. However, since this prevents the television 101 from performing the IP conversion processing/NR processing and the scaler processing in the low-delay processing mode, interlaced signals such as of 180i or 1080i cannot be processed. On the other hand, when non-scaling (Dot-by-Dot) processing is performed for progressive signals, the delay time can be reduced. In other words, the television 101 can reduce the delay time when the low-delay processing mode is selected under a certain restriction.

Figure 5:
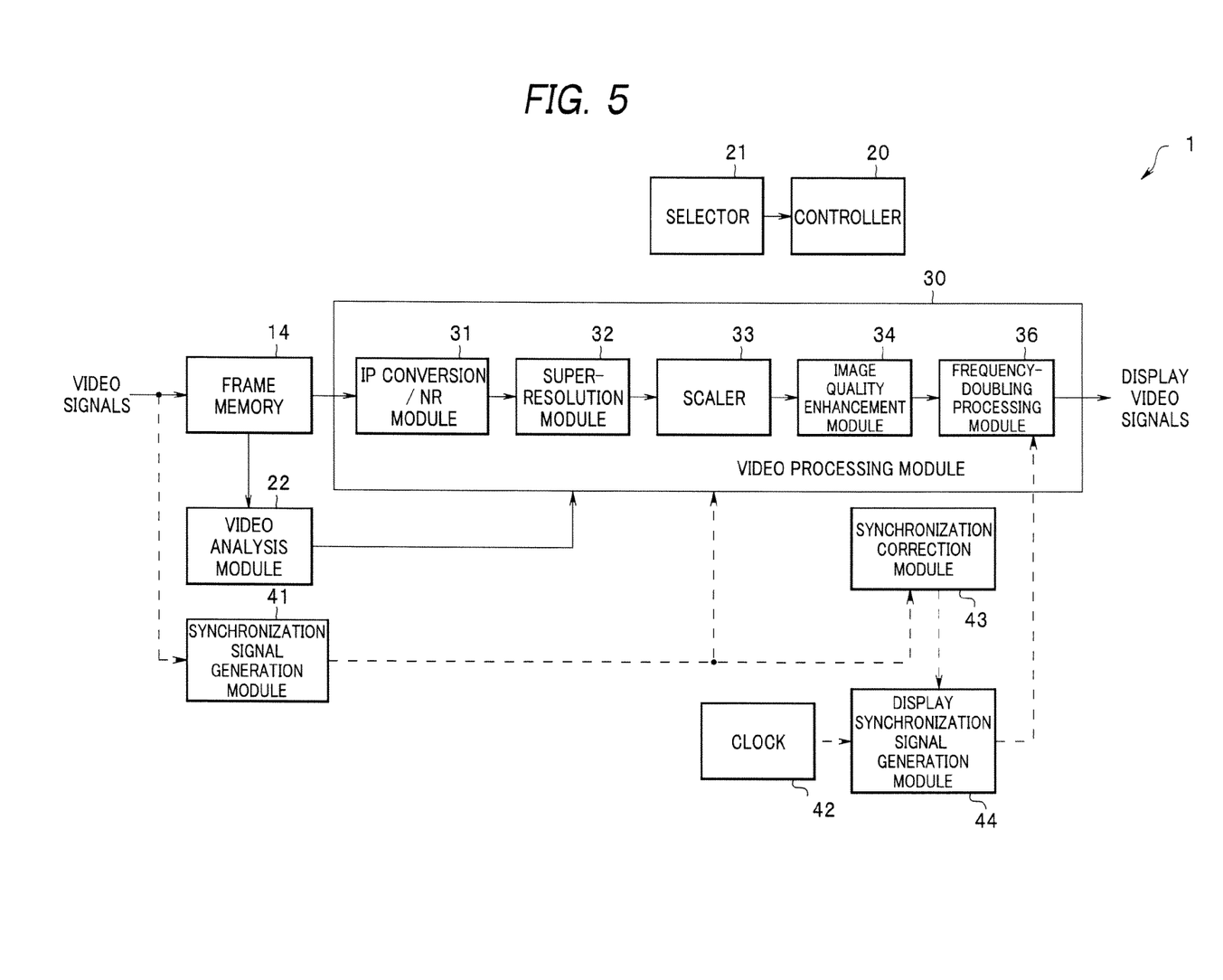
FIG. 5 is a block diagram for illustrating signal processing in the television receiver apparatus in the embodiment.

On the other hand, the television 1 in the present embodiment has processing modules and the like similar to the television 101 shown in FIGS. 2A and 2B. Specifically, as shown in FIG. 5, compared with the television 101, the television 1 in the present embodiment eliminates memory corresponding to the frame memory 114B and differs in the order of signal processing in the video processing module 30. That is, since a video analysis module 22 can perform analysis processing by using video signals stored in the frame memory 14, the frame memory 114B included in the television 101 is unnecessary, and an image quality enhancement module 34 is not configured to directly read video from frame memory. Therefore, the television 1 has the frame memory 14, an IP conversion/NR module 31, a super-resolution module 32, a scaler 33, the image quality enhancement module 34, a frequency-doubling processing module 36, the video analysis module 22, a synchronization signal generation module 41, a clock 42, a synchronization correction module 43, and a display synchronization signal generation module 44. The modules with the same names as the ones already described for the television 101 have like functions and therefore will not be described here. The video analysis module 22, the synchronization signal generation module 41, the clock 42, the synchronization correction module 43, and the display synchronization signal generation module 44 are also included in the television 101 but have not been described above.

The video analysis module 22 analyzes video signals stored in the frame memory 14 and outputs frame information to be used by the controller 20 for controlling the video processing module 30. That is, for example, the video analysis module 22 obtains brightness histogram data for one frame by dividing the dynamic range of the brightness level into n levels and counting, for video signals for one frame, the number of pixels corresponding to each of the brightness levels 1 to n. The video analysis module 22 also detects the frequency distribution of video signals, for example. In the television 101, the video analysis module analyzes video signals stored in the frame memory 114B and outputs the video signals to the image quality enhancement module 134 and the super-resolution module 132.

Figure 6:
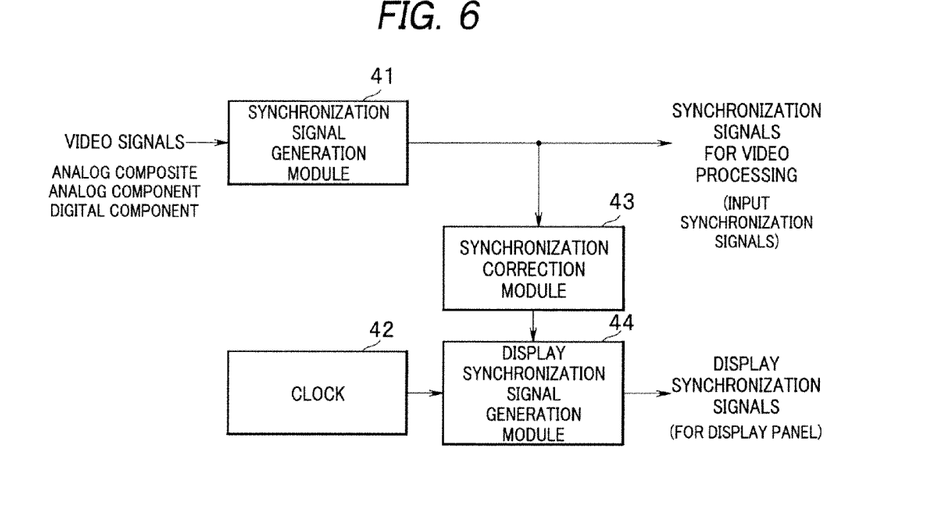
FIG. 6 is a block diagram showing a relationship between synchronization signals for input video signals and synchronization signals for display video signals for illustrating a synchronization correction module.

As shown in FIG. 6, the synchronization signal generation module 41 separates and generates synchronization signals from input video signals. The clock 42 generates signals of a predetermined frequency, and based on the signals generated by the clock 42, the display synchronization signal generation module 44 generates synchronization signals (display synchronization signals) for display video signals to be displayed on the display panel 15.

Figure 7A:
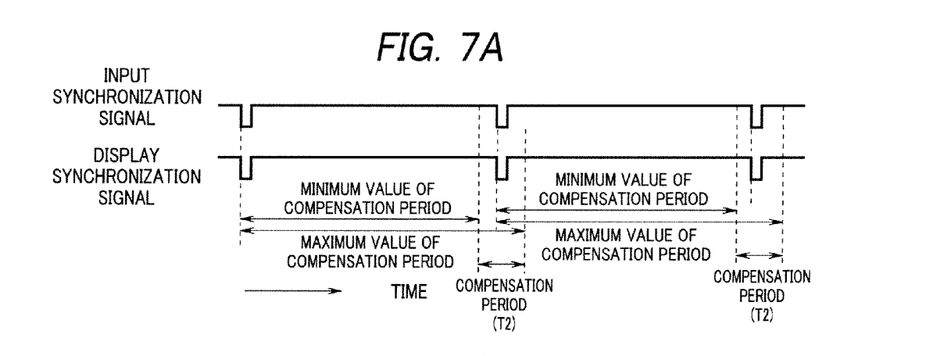
FIG. 7A is a time chart for illustrating operation of the synchronization correction module.
Figure 7B:
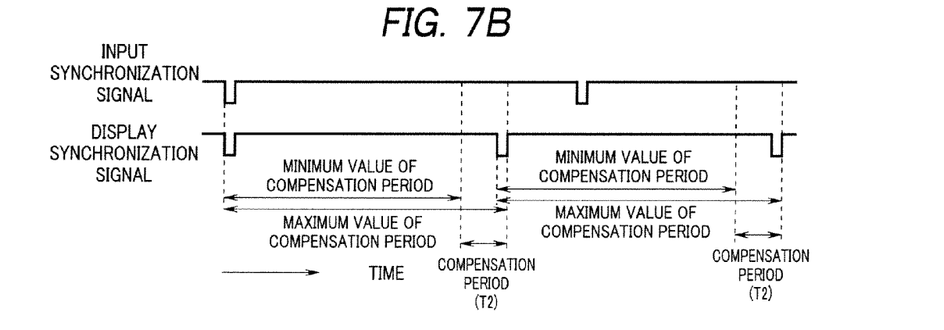
FIG. 7B is a time chart for illustrating operation of the synchronization correction module.

As shown in FIGS. 6, 7A, and 7B, the synchronization correction module 43 synchronizes the input synchronization signals for video signals generated by the synchronization signal generation module 41 and the display synchronization signals generated by the display synchronization signal generation module 44. That is, as shown in FIG. 7A, the synchronization correction module 43 generates a display synchronization signal synchronized with an input synchronization signal occurring in a predetermined synchronization compensation period (T2) and outputs the display synchronization signal to the display panel 15. If a synchronization signal for video signal processing cannot be obtained in the predetermined synchronization compensation period (T2), as shown in FIG. 7B, the synchronization correction module 43 generates a synchronization signal on the maximum-value side of the synchronization compensation period and enters what is called a free-running state, in which oscillation is continued at an inherent oscillation frequency.

Although FIGS. 7A and 7B illustrate a case where the compensation period is set for every frame to perform the synchronization compensation processing for every frame, the compensation period may be set to a two-frame length to perform the synchronization compensation processing for every two frames, for example.

In the television 1, even when the low-delay processing is ON (the low-delay processing ON mode), the video processing module 30 performs all the signal processing shown in FIG. 5 as performed when the low-delay processing is OFF (the low-delay processing OFF mode). However, when the low-delay processing is OFF, the controller 20 controls the video processing module 30 to start the signal processing after the completion of storage processing of storing video signals for one frame in the frame memory 14. In contrast, when the low-delay processing is ON, the controller 20 controls the video processing module 30 to start the signal processing at the lapse of a predetermined period (T1), a waiting time, after the start of the storage processing without waiting until the completion of the storage processing of storing the video signals for one frame in the frame memory 14. That is, it takes time corresponding to one frame (about 16.7 ms) to complete the storage processing of storing the video signals for one frame in the frame memory 14. When the low-delay processing is ON, the signal processing of the video processing module 30 is started at the lapse of the predetermined time (T1) shorter than the time corresponding to one frame. This allows the delay time to be reduced by the time roughly corresponding to one frame. The predetermined time (T1) may be 1.5 ms, for example.

As described above, the video display apparatus in the present embodiment includes: a video processing module configured to perform signal processing for input video signals and to output display video signals; a display module configured to display the display video signals; a selector configured to turn ON/OFF the operation of low-delay processing that involves a short delay time of the display video signals with respect to the video signals as signal processing; and a controller configured to control the video processing module so as to perform IP conversion/noise reduction processing and scaling processing conformable to the display module when the operation of the low-delay processing is ON and when OFF according to the selector.

Figure 8:
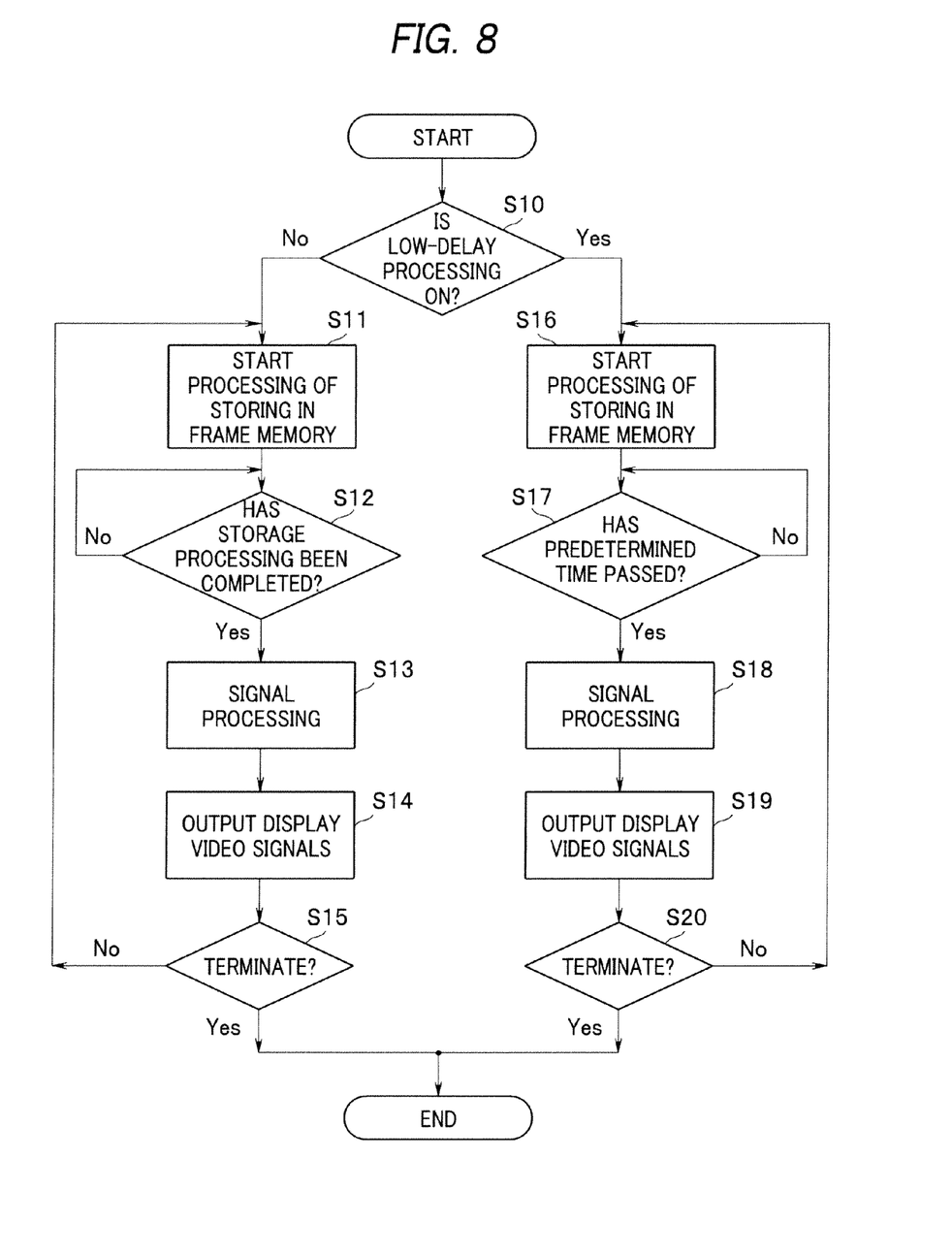
FIG. 8 is a flowchart for illustrating a flow of video signal processing in the television receiver apparatus in the embodiment.

With reference to a flowchart in FIG. 8, a process flow of the video processing module 30 in the television 1 in the present embodiment will be described below.

<Step S10> Processing Selection Step

Figure 9:
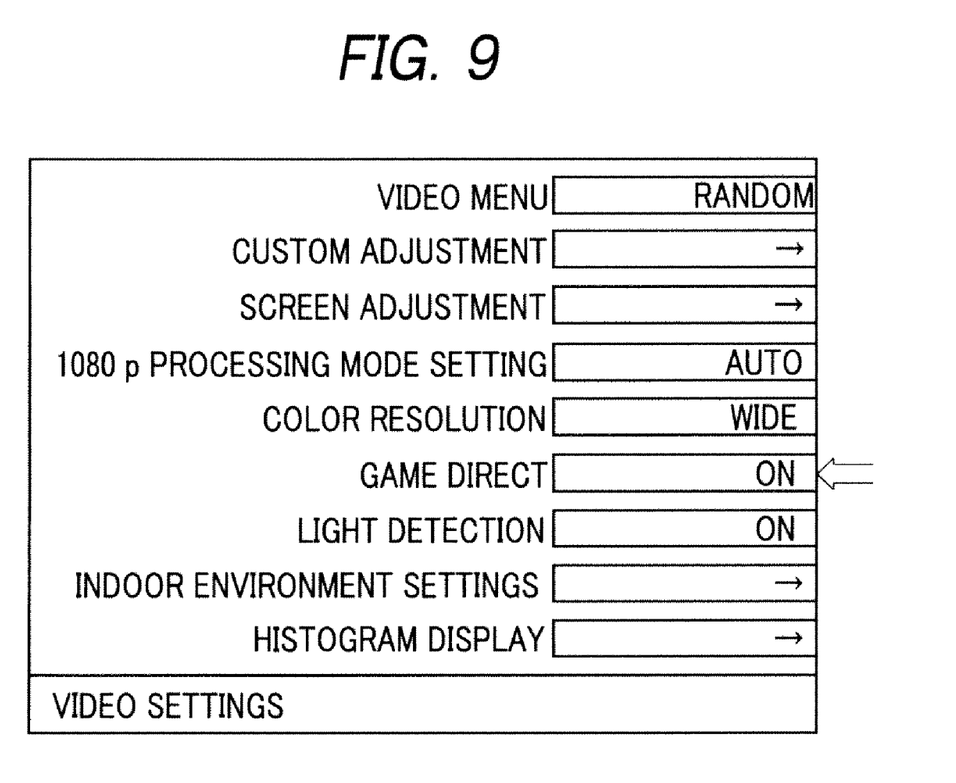
FIG. 9 is a diagram showing a display screen for illustrating how to select a processing mode in the television receiver apparatus in the embodiment.

As the signal processing mode, processing selection is performed in which the operation of the low-delay processing that involves a short delay time of display video signals with respect to video signals is turned ON/OFF. In the selection of the signal processing mode, for example, a menu screen as shown in FIG. 9 is displayed on the display panel 15. If a user switches the setting of "Game Direct" from "OFF" to "ON" with a remote control or the like, the low-delay processing ON mode is selected by the selector 21. Conversely, if the user switches the setting of "Game Direct" from "ON" to "OFF," the low-delay processing OFF mode is selected. It is also possible to have an external input terminal dedicated to the gaming machine 3, so that the selector 21 automatically turns ON the operation of the low-delay processing when a signal from the gaming machine 3 is input.

<Step S11> Storage Processing Starting Step

If the low-delay processing is not ON (S10: No), that is, in the low-delay processing OFF mode, storage processing of storing video signals for one frame in the frame memory 14 is started.

<Step S12> Has Storage Processing Been Completed?

The controller 20 controls the video processing module 30 not to start the signal processing until the storage processing of storing the video signals for one frame in the frame memory 14 is completed (S12: Yes).

<Step S13> Signal Processing Step

When the storage processing of storing the video signals for one frame is completed (S12: Yes), the controller 20 controls the video processing module 30 to start the signal processing. The video processing module 30 then performs the signal processing of converting the video signals into display video signals to be displayed on the display panel 15. Specifically, as shown in FIG. 5, the IP conversion/NR processing, the super-resolution processing, the scaling processing, the image quality enhancement processing, the synchronization correction processing, and the frequency-doubling processing are sequentially performed.

If the analysis of the video analysis module 22 indicates that the video signals for the frame is not preferable for display on the display panel 15 such as due to significantly degraded signals, the controller 20 may not output the display video signals for the frame to the display panel 15.

<Steps S14, S15> Output Display Video Signals

The video processing module 30 performs the signal processing for the video signals and outputs the display video signals to the display panel 15. Then, signal-processed video is displayed on the display panel 15. The processing from S11 is repeated until termination (S15: Yes)

<Step S16> Storage Processing Starting Step

If the low-delay processing ON mode is selected in S10 (S10: Yes), the storage processing of storing video signals for one frame in the frame memory 14 is also started as in S11.

<Step S17> Has Predetermined Time Passed?

The controller 20 uses a timer or the like (not shown) to measure the time from the start of the storage processing of storing in the frame memory 14 and controls the video processing module 30 not to start the signal processing until a predetermined time (delay value: T1) passes (S17: Yes). In other words, processing of reading the video signals stored in the frame memory 14 is not started until the predetermined time (delay value: T1) passes after the start of the storage processing of storing in the frame memory 14.

This is to prevent the occurrence of what is called an "overtaking phenomenon," where the writing processing and the reading processing cross each other.

Figure 10A:
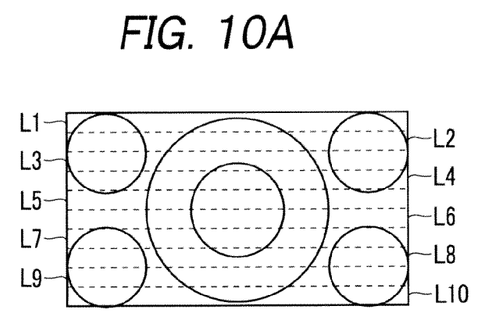
FIG. 10A is an illustrative diagram for illustrating an "overtaking phenomenon," showing written video.
Figure 10B:
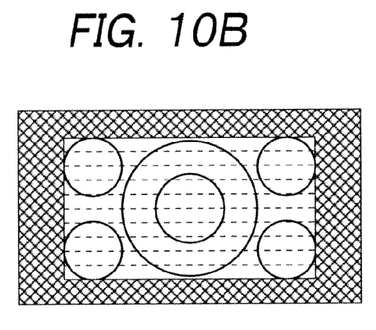
FIG. 10B is an illustrative diagram for illustrating the "overtaking phenomenon," showing read video.
Figure 10C:
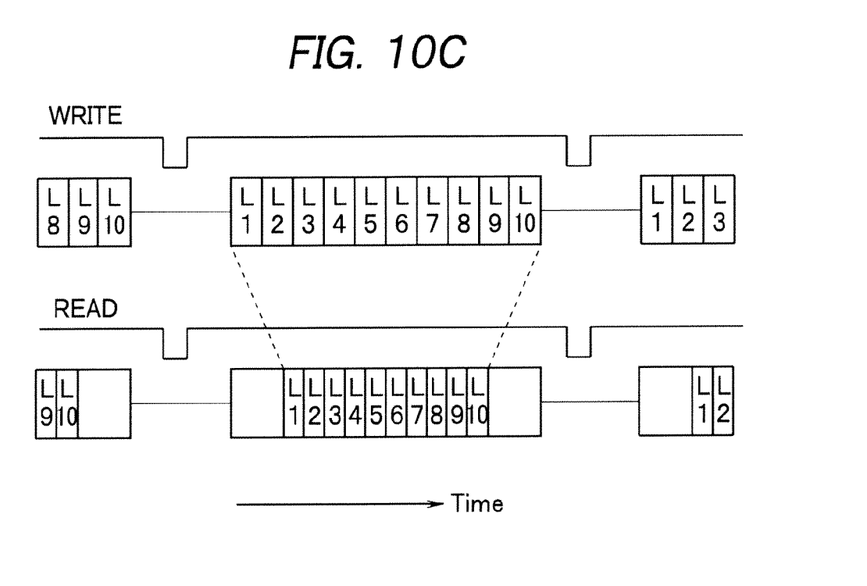
FIG. 10C is an illustrative diagram for illustrating the "overtaking phenomenon," showing a time chart in writing/reading.

Here, the "overtaking phenomenon" will be described by taking a case as an example in which written video divided into 10 line groups (L1 to L10) as shown in FIG. 10A is pasted at the center of display video as shown in FIG. 10B. As shown in the upper layer of FIG. 10C, processing of writing (storing) the 10 line groups (L1 to L10) in memory is sequentially performed along with a timeline. However, as shown in the lower layer of FIG. 10C, due to the existence of areas corresponding to the top and bottom of the display video in FIG. 10B, data of a line group just written cannot be read at the same time as the start of the writing processing, and the attempt of reading may result in reading data of one frame before. This is the "overtaking phenomenon." Similarly, attempting to read the video signals stored in the frame memory 14 at the same time as the start of the storage processing or at the lapse of an extremely short time after the start of the storage processing causes the "overtaking phenomenon," where the stored signals cannot be reliably read.

Therefore, the controller 20 controls the video processing module 30 not to start the signal processing using the video signals stored in the frame memory 14 until the predetermined time (T1) passes (S17: Yes). The predetermined time (T1) is determined as appropriate, depending on the resolution of the video signals, the display method for the display video signals, or the like.

Further, in the initial stage of the operation of switching the low-delay processing from ON to OFF and from OFF to ON, the relationship between the predetermined time (T1) for which the video processing module 30 waits before starting the signal processing and the synchronization compensation period (T2) of the synchronization correction module 43 is important. That is, when the low-delay processing mode is switched from OFF to ON, the video processing module 30 needs to delay the phase of the synchronization signal for the output video signals in order to delay the start of the processing by the predetermined time (T1). Conversely, when the low-delay processing mode is switched from ON to OFF, the predetermined time (T1) is no more necessary. Therefore, the video processing module 30 needs to perform processing of bringing back the phase of the synchronization signal for the output video signals to the state before being delayed.

Figure 11:
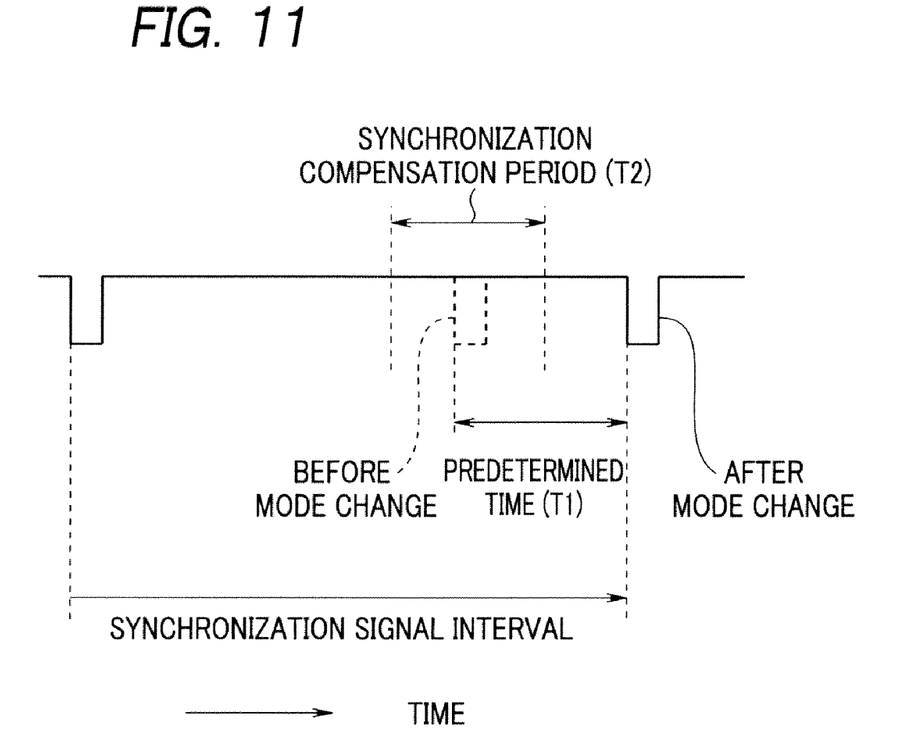
FIG. 11 is a time chart for illustrating a delayed synchronization phenomenon.

The synchronization correction module 43 synchronizes the synchronization signal for the output video signals with the input video signals. To perform the low-delay processing, the processing of delaying the phase of the synchronization signal for the output video signals by the predetermined time (T1) is needed, as described above. At this point, if the predetermined time (T1) is longer than the synchronization compensation period (T2), performing the phase setting processing for the predetermined time (T1) at one time in one frame period causes the synchronization signal for the output video signals to exceed the synchronization compensation range (T2) as shown in FIG. 11. As a result, the synchronization correction module 43 cannot generate a synchronization signal at an inherent free-running frequency. That is, the synchronization signal for the output video signals will become a synchronization signal out of compensation and will be input to the modules in the subsequent stages and the display panel 15. If this state occurs, the reliability of the display panel 15 and the like may be reduced.

Therefore, if the predetermined time (T1) necessary for preventing the occurrence of the "overtaking phenomenon" is longer than the synchronization compensation period (T2), the controller 20 controls to perform the signal processing by dividing the predetermined time (T1) into a plurality of (N) compensable times (T3) shorter than the synchronization compensation period (T2). In other words, the storage processing starting step in step S16 has a synchronization correction adjustment step in which, for the signal processing of every frame, the start of the signal processing is delayed by the compensable time shorter than the synchronization compensation period of the synchronization correction module, until the predetermined time is reached.

That is, the synchronization correction adjustment step is performed only when the low-delay processing is switched from ON to OFF or from OFF to ON. In the signal processing for an N-th frame after starting the storage processing of storing in the frame memory 14, the controller 20 does not start the processing of reading the video signals stored in the frame memory 14 until the synchronization correction adjustment period (T3×N) passes. The synchronization correction adjustment step is a transitional step performed until the synchronization correction adjustment period (T3×N) reaches the predetermined time (T1).

Thus, for the signal processing of every frame, the start of the signal processing is delayed by the compensable time (T3) to thereby delay the phase of the synchronization signal by the compensable time (T3). Upon completion of the signal processing of N frames (upon completion of the synchronization correction adjustment), the phase has been delayed by the predetermined time (T1). By controlling in this manner, the synchronization correction module 43 can correct the synchronization signal because the compensable time (T3) is within the synchronization compensation period (T2). Since displayed video gets disturbed for the N frames during the synchronization correction adjustment, a blue screen is displayed with a video mute function, for example.

The compensable time (T3) may be of any length shorter than the synchronization compensation period (T2). However, as the number of divisions N increases, the synchronization correction adjustment processing requires more time and the blue screen is displayed for a longer duration. Therefore, for example, the compensable time (T3) is preferably 90 to 100% of the synchronization compensation period (T2). By way of example, if the synchronization compensation period (T2) is 0.15 ms and the predetermined time (T1) is 1.5 ms, the compensable time (T3) is 0.13 to 0.15 ms and therefore the number of divisions N is 10 to 12. Each compensable time (T3) resulting from dividing into N does not need to be of a uniform length.

As described above, when the selector 21 switches the low-delay processing ON/OFF, the controller 20 preferably controls the video processing module 30 to delay or advance the start of the signal processing incrementally for the signal processing of every frame, by the compensable time (T3) shorter than the synchronization compensation period (T2) of the synchronization correction module 43, until the predetermined time (T1) is reached. This is because there is no possibility that signals that cannot be synchronized are input to components such as the display panel 15.

In the television 101 described for comparison, the synchronization correction adjustment step is not needed because the misalignment of synchronization can be absorbed (corrected) during the delay time occurring due to the frame memory.

<Step S18> Signal Processing Step

When the predetermined time (T1) has passed (S17: Yes), the controller 20 controls the video processing module 30 to start the signal processing without waiting until the completion of the storage processing of storing the video signals for one frame in the frame memory 14. The video processing module 30 then performs the signal processing of converting the video signals into display video signals to be displayed on the display panel 15 as in the low-delay processing OFF mode. Specifically, as shown in FIG. 5, the IP conversion/NR processing, the super-resolution processing, the scaling processing, the image quality enhancement processing, the synchronization correction processing, and the frequency-doubling processing are sequentially performed.

<Steps S19, S20> Output Display Video Signals

The video processing module 30 performs the signal processing for the video signals and outputs the display video signals to the display panel 15. Then, signal-processed video is displayed on the display panel 15. The processing from S16 is repeated until termination (S20: Yes).

Figure 12:
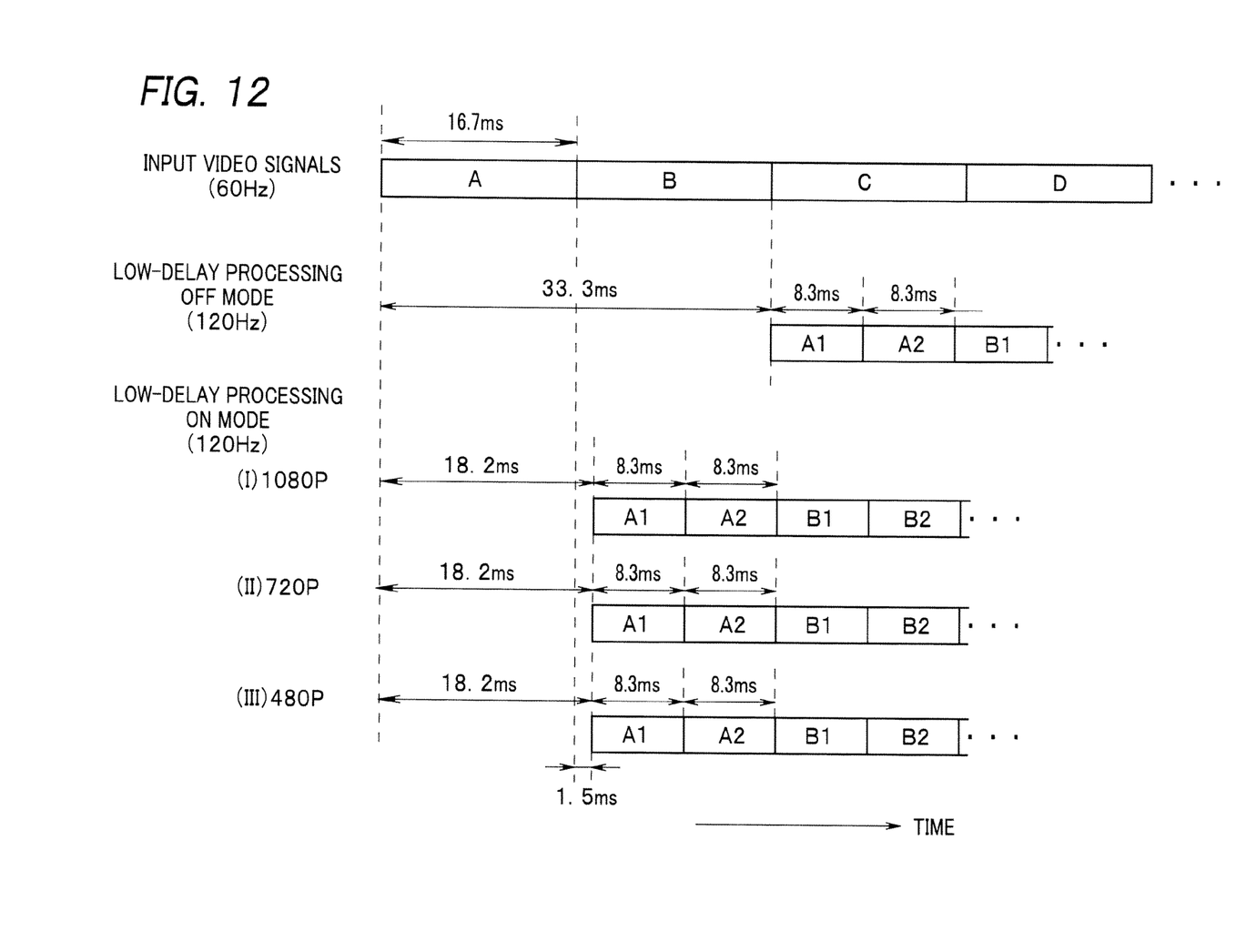
FIG. 12 is a time chart for illustrating delay times in the television receiver apparatus in the embodiment.

As shown in FIG. 12, in the television 1 in the present embodiment, the delay time in the low-delay processing OFF mode is 33.3 ms corresponding to two frames, whereas the delay time in the low-delay processing ON mode is 18.2 ms corresponding to about one frame, for example. Further, as shown in FIG. 12, even for input video signals of 720 p and 480 p that are smaller than 1080 p of the display panel, the delay time is 18.2 ms, which is the same as in the case of 1080 p, because the scaling processing is performed.

That is, in the low-delay processing ON mode, the television 1 involves the delay time corresponding to one frame due to the frequency-doubling processing. The total delay time is the sum of the time corresponding to one frame and the predetermined time (T1) necessary for preventing the occurrence of the "overtaking phenomenon." Therefore, the total delay time is a time only slightly longer than the time corresponding to one frame, namely, less than the time corresponding to two frames. It is apparent that the delay time will be further reduced if the frequency-doubling processing is not performed.

As described above, the television 1 in the present embodiment includes the controller 20 configured to control the video processing module 30 to perform the IP conversion/noise reduction processing, the scaling processing conformable to the display module, and the resolution increasing processing for increasing the resolution of the video signals, irrespective of whether the operation of the low-delay processing is ON or OFF according to the selector 21.

Thus the television 1 in the present embodiment can perform at least the IP conversion/NR processing, the scaling processing, and the super-resolution processing even in the low-delay processing ON mode. By way of example, the television 1 can also perform more pieces of complex processing as necessary, by using a higher-performance system LSI.

In the television 1, the display video signals have a high quality because the IP conversion/NR processing, the scaling processing, and the super-resolution processing are performed even in the low-delay processing ON mode.

As described above, the television 1 in the present embodiment is a video display apparatus in which displayed video and output audio during display of game content or the like do not give a user a strange feeling against the user's operation through a gaming operation unit 4. The video processing method for the television 1 allows displaying video that does not give a user a strange feeling during display of game content or the like.

The television 1 having the synchronization correction adjustment step is highly reliable because synchronization signals out of compensation are never input to the modules in the subsequent stages.

While a certain embodiment has been described, the embodiment has been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A video display apparatus comprising:
   a video processing module configured to perform signal processing for input video signals and to output display video signals to a display module;
   a selector configured to turn ON/OFF operation of low-delay processing in which a delay time of the display video signals with respect to the video signals is reduced, as the signal processing;

a frame memory configured to store the video signals for at least one frame; and a controller configured to control the video processing module to perform scaling processing conformable to the display module when the operation of the low-delay processing is ON and when OFF according to the selector, wherein the video processing module performs signal processing for the video signals stored in the frame memory and outputs the display video signals, and when the low-delay processing is ON, the controller controls the video processing module to start the signal processing after a lapse of a predetermined time from start of storage processing of storing the video signals for the at least one frame in the frame memory and before completion of the storage processing.

2. The video display apparatus according to claim 1, wherein when the low-delay processing is OFF, the controller controls the video processing module to start the signal processing after the completion of the storage processing of storing the video signals for the at least one frame in the frame memory.

3. The video display apparatus according to claim 2, wherein when the operation of the low-delay processing is ON according to the selector, the controller controls the video processing module to perform at least one of IP conversion processing and noise reduction processing for the video signals.

4. The video display apparatus according to claim 3, wherein the video processing module comprises a resolution increasing module configured to increase a resolution of the video signals, and when the operation of the low-delay processing is ON according to the selector, the controller controls to perform the processing by the resolution increasing module.

5. The video display apparatus according to claim 2, wherein the video processing module comprises a resolution increasing module configured to increase a resolution of the video signals, and when the operation of the low-delay processing is ON according to the selector, the controller controls to perform the processing by the resolution increasing module.

6. The video display apparatus according to claim 1, wherein when the operation of the low-delay processing is ON according to the selector, the controller controls the video processing module to perform at least one of IP conversion processing and noise reduction processing for the video signals.

7. The video display apparatus according to claim 6, wherein the video processing module comprises a resolution increasing module configured to increase a resolution of the video signals, and when the operation of the low-delay processing is ON according to the selector, the controller controls to perform the processing by the resolution increasing module.

8. The video display apparatus according to claim 1, wherein the video processing module comprises a resolution increasing module configured to increase a resolution of the video signals, and when the operation of the low-delay processing is ON according to the selector, the controller controls to perform the processing by the resolution increasing module.

9. The video display apparatus according to claim 1, wherein the video processing module comprises a synchronization correction module configured to synchronize an input synchronization signal for the video signals and a display synchronization signal for the display module, and when the low-delay processing is switched ON/OFF according to the selector, the controller controls the video processing module to delay, for the signal processing of every frame, the start of the signal processing by a compensable time shorter than a synchronization compensation period of the synchronization correction module.

10. The video display apparatus according to claim 1, further comprising a frame analysis block configured to analyze the video signals for one frame stored in the frame memory and to output frame information to be used by the controller for controlling the video processing module.

11. The video display apparatus according to claim 1, wherein the video processing module comprises a frequency-doubling processing module configured to perform frequency-doubling processing for the video signals, and the delay time is less than a time corresponding to two frames.

12. A video processing method for performing signal processing for input video signals to convert the video signals into display video signals to be displayed on a display module, the method comprising:

starting storage processing of storing the video signals for one frame in a frame memory;

performing processing selection in which operation of low-delay processing, in which a delay time of the display video signals with respect to the video signals is reduced, is turned ON/OFF as a signal processing mode;

performing signal processing of the video signals being stored in the frame memory in which the signal processing is started after a lapse of a predetermined time from start of the storage processing and before the completion of the storage processing when the low-delay processing is ON; and performing signal processing in which scaling processing conformable to the display module is performed in either case where the low-delay processing is ON or OFF.

13. The video processing method according to claim 12, wherein performing the signal processing comprises performing at least one of IP conversion processing and noise reduction processing.

14. The video processing method according to claim 12, wherein the signal processing is started after completion of the storage processing of storing the video signals for the one frame when the low-delay processing is OFF in performing the signal processing.

15. The video processing method according to claim 13, wherein
the signal processing is started after completion of the storage processing of storing the video signals for the one frame when the low-delay processing is OFF in performing the signal processing.

* * * * *